United States Patent [19]

Shute

[11] Patent Number: 5,009,458

[45] Date of Patent: Apr. 23, 1991

[54] POUCH FOR MOUNTING TO A VEHICLE DOOR

[76] Inventor: Thomas A. Shute, 5055 Meeker Drive, Kalama, Wash. 98625

[21] Appl. No.: 342,739

[22] Filed: Apr. 24, 1989

[51] Int. Cl.$^5$ .............................................. B60R 7/04
[52] U.S. Cl. .................................. 296/37.13; 296/152; 248/95; 224/42.46 R
[58] Field of Search ..................... 296/37.1, 37.5, 37.8, 296/37.13, 146, 152; 224/42.46 R, 273, 277; 248/95

[56] References Cited

U.S. PATENT DOCUMENTS

| | | | |
|---|---|---|---|
| 666,296 | 1/1901 | Wiard | 224/42.46 R |
| 1,392,092 | 9/1921 | Thompson | 224/42.46 RX |
| 1,393,359 | 10/1921 | Haon | 296/37.13 |
| 1,486,566 | 3/1924 | Crecelius | 296/152 X |
| 1,523,323 | 1/1925 | Wensinger | 296/37.13 |
| 1,727,485 | 9/1929 | Salley | 224/273 |
| 1,815,028 | 7/1931 | Burch | 224/273 |
| 1,995,143 | 3/1935 | Burch | 296/37.13 |
| 3,017,070 | 1/1962 | London | 224/42.46 RX |
| 3,151,649 | 10/1964 | Mitchell, Jr. | 224/42.46 RX |
| 3,598,297 | 8/1971 | Welch | 224/42.46 R |
| 4,512,504 | 4/1985 | Owlett | 224/42.46 R |
| 4,830,238 | 5/1989 | Widinski et al. | 224/42.46 R |

FOREIGN PATENT DOCUMENTS 1345182  1/1974  United Kingdom ......... 224/42.46 R

Primary Examiner—Margaret A. Focarino
Assistant Examiner—Andrew C. Pike
Attorney, Agent, or Firm—Dellett, Smith-Hill and Bedell

[57] ABSTRACT

A pouch is mounted on a vehicle door that comprises a frame, an inside panel, and screws securing the inside panel to the frame, using an elongate mounting bracket coupled to the pouch and having two opposite ends and a hole adjacent each end. Two of the screws are removed, from opposite respective edges of the door, and the bracket is placed against the inside panel with the holes aligned with the screw holes in the door frame. The screws are inserted into the door frame through the respective holes in the mounting bracket.

6 Claims, 1 Drawing Sheet

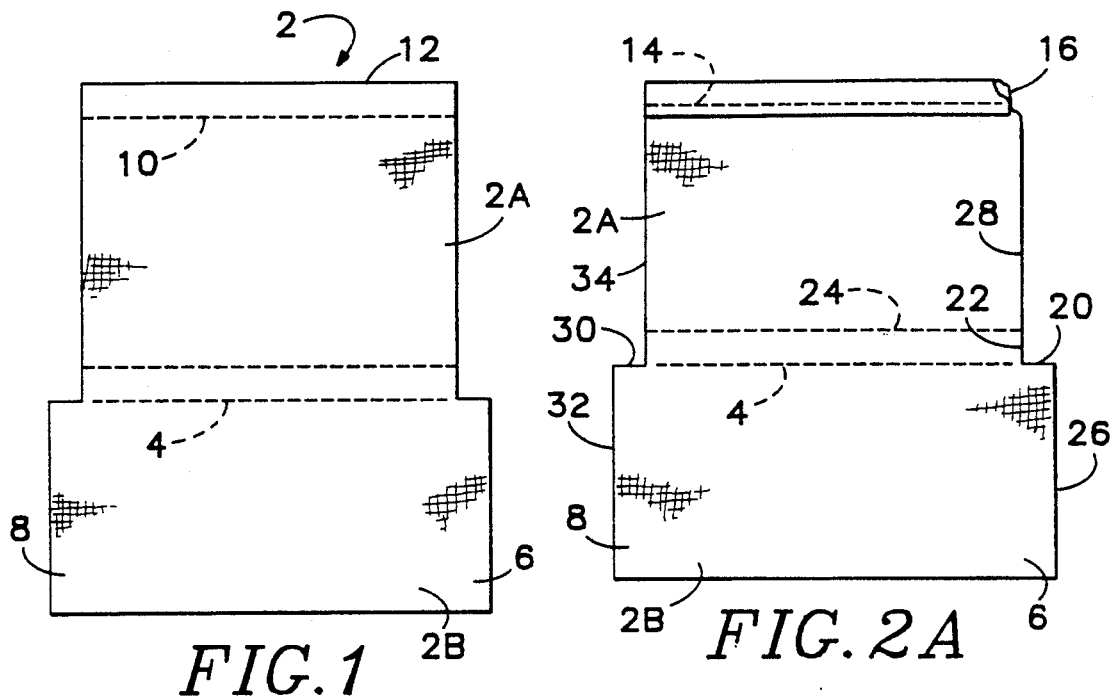
FIG. 1
FIG. 2A
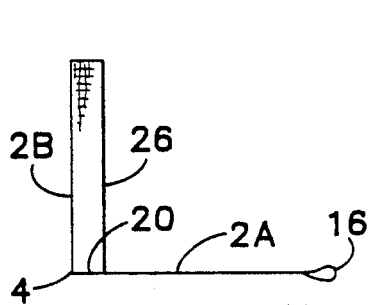
FIG. 2B
FIG. 3
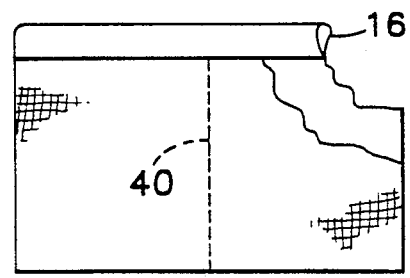
FIG. 4
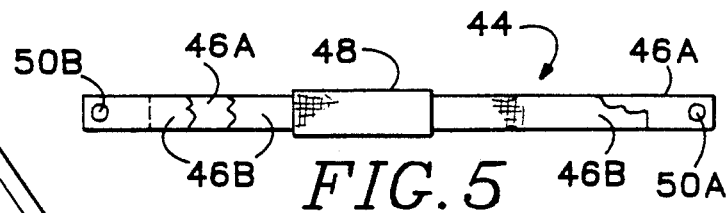
FIG. 5
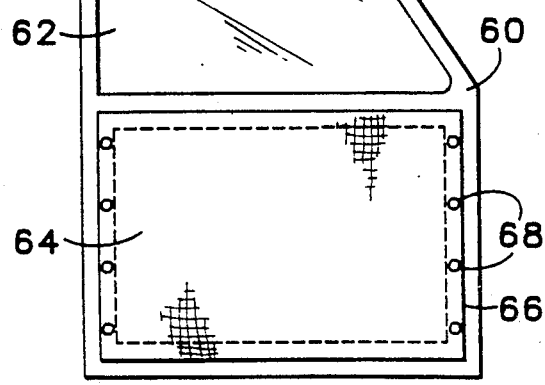
FIG. 6
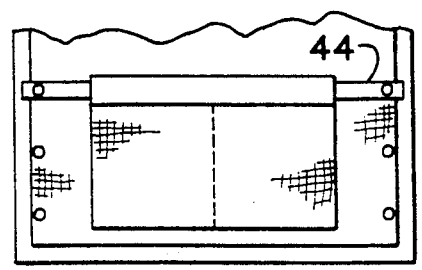
FIG. 7

POUCH FOR MOUNTING TO A VEHICLE DOOR

BACKGROUND OF THE INVENTION

This invention relates to a pouch for mounting to a vehicle door.

When driving a truck, it is frequently necessary to have access to various things such as maps and delivery instructions. It is also convenient for the driver of a truck to have books and magazines available for reading while the truck is stationary, for example during rest periods. Maps, books, and similar articles can be kept close at hand and well organized by placing them in a pouch attached to the driver's side door of the truck.

The door of a truck generally comprises a metal frame which defines a window opening at its top and is enclosed at the bottom by an outside metal panel, which is integral with the frame, and an inside panel, which is held in place by screws that enter the metal frame. The inside panel may be made of fiber material, covered with a vinyl decorative layer.

It is known for a truck driver to attach his pouch to the door by use of two-part snap fasteners, one part of each snap fastener being attached to the inside door panel and the other part of the fastener being attached to the pouch. In order to attach the snap fasteners to the inside door panel, it is necessary to remove the panel and drill holes in the panel. This is inconvenient, and also damages the panel. Moreover, if a large quantity of material is placed in the pouch, the snap fasteners may separate and the pouch will then fall between the driver's seat and the door and will not be readily accessible.

A second method of attaching a pouch to the driver's door is by use of hook and loop material, such as that sold under the trademark VELCRO. The hook material, for example, may be attached to the inside door panel by use of self-tapping screws and the loop material is attached to the pouch, typically by stitching. This method of attaching the pouch avoids the inconvenience of having to remove the door panel, but is subject to the other disadvantages of using snap fasteners.

A third method of attaching a pouch to the door involves use of screws that pass through the material of the pouch and engage the inside door panel. This method avoids the problem of the pouch possibly falling from the door, except in the most extreme circumstances, but increases the possibility of damage to the door panel because if sufficient weight is applied to the pouch for the pouch to fall, it will normally involve the screws being torn from the panel.

SUMMARY OF THE INVENTION

In accordance with a first aspect of the invention there is provided a method of mounting a pouch on a vehicle door comprising a frame, an inside panel, and screws securing the inside panel to the frame. The method comprises selecting two screws at opposite respective edges of the panel, and providing an elongate mounting bracket having two opposite ends and having a hole adjacent each end, the distance between the holes being substantially equal to the distance between the selected screws, and the bracket being coupled to the pouch. The method further comprises removing the selected screws, placing the bracket against the door panel with the holes aligned with the screw holes in the door frame, and inserting the screws into the door frame through the respective holes in the mounting bracket.

In accordance with a second aspect of the invention there is provided a pouch assembly for attachment to a vehicle door. The pouch assembly comprises an elongate mounting bracket having first and second opposite ends, and a pouch coupled to the bracket to be supported thereby when the bracket is attached by its opposite ends to a door of a vehicle.

In accordance with a third aspect of the invention there is provided, in combination, a vehicle door having a metal frame and an inside panel, the inside panel being attached to the frame by screws, and a pouch assembly for attachment to the door. The pouch assembly comprises an elongate mounting bracket having first and second opposite ends, and a pouch coupled to the bracket to be supported thereby when the bracket is attached by its opposite ends to a door of a vehicle.

BRIEF DESCRIPTION OF THE DRAWINGS

For a better understanding of the invention, and to show how the same may be carried into effect, reference will now be made, by way of example, to the accompanying drawings in which:

FIG. 1 is a front elevation of a sheet of fabric used in manufacture of a pouch assembly embodying the invention, FIG. 2A is a front elevation of the sheet at a first stage in manufacture of the pouch assembly, FIG. 2B is a side elevation of the sheet at a second stage in manufacture of the pouch assembly, FIG. 3 is a side elevation of the sheet when the pouch itself is completed, FIG. 4 is a front elevation of the completed pouch, FIG. 5 is a partial elevation of a support bracket that also forms part of the pouch assembly, FIG. 6 is a front elevation of a truck door, and FIG. 7 is a partial front elevation of the truck door with the pouch assembly attached thereto.

DETAILED DESCRIPTION

FIG. 1 shows a generally rectangular sheet 2 of plastic-reinforced fabric. The sheet has an upper portion 2A, above a line 4, and a lower portion 2B, below the line 4. The height of upper portion 2A is about 46 cm and its width is about 71 cm. The height of lower portion 2B is about 31 cm and its width is about 79 cm, so that lower portion 2B has two tabs 6, 8 that project laterally about 4 cm beyond the sides of portion 2A. Sheet 2 is folded along a line 10 about 8 cm from the top 12 of the sheet and is then sewn along a line 14 to define a tubular sleeve 16 (see FIG. 2A). The sheet is then folded along line 4, which divides upper and lower portions 2A and 2B of the sheet, and edge 20 of tab 6 is sewn to segment 22 of the adjacent side of upper portion 2A (see FIG. 2B). The sheet is folded along line 24, about 4 cm above line 18, and edge 26 of tab 6 is sewn to segment 28 of the adjacent side of upper portion 2A. Edges 30 and 32 of tab 8 are similarly sewn to side 34 of upper portion 2A, and a pocket is thereby formed between the two portions 2A, 2B. If desired, the sheet may be sewn along a line 40 to divide the pocket into two.

A mounting bracket 44 (FIG. 5) is fitted inside sleeve 16. Bracket 44 comprises two metal bars 46A, 46B, each about 61 cm long, 2.5 cm wide, and 1.5 mm thick. The two bars are held in face to face relationship by a sleeve 48 which is about 10 cm long. The sleeve allows the two bars to move longitudinally relative to each other, so that the length of the bracket can be adjusted, but does not allow any other significant relative movement of the two bars. The two bars have respective holes 50A, 50B near their ends.

The truck door 58 shown in FIG. 6 comprises a metal frame 60 defining a window opening 62 and a chamber 64 containing the door lock and the window mechanism (not shown). The chamber is covered by an inside door panel 66, which is attached to the metal frame by screws 68.

The pouch is mounted to door 58 by removing two of the screws 68 that are used to secure the panel 66 to opposite edges of the metal frame 60 and are at about the same height. The length of mounting bracket 44 is adjusted so that the distance between holes 50A and 50B is equal to the distance between the screw holes in the door frame, and the bracket is positioned so that holes 50A and 50B are aligned with these screw holes respectively. The screws are then replaced, and serve to hold the bracket securely to the frame of the door and thereby support the pouch firmly. The pouch can be readily removed simply by removing the screws that were used to mount it, and replacing the screws in their holes in the door. The inside panel is not damaged in the slightest.

If existing screw holes are not positioned suitably for convenient mounting of the bracket, holes may be drilled through panel 66 into frame 60. Although this causes damage to the panel, the damage is only slight because the weight of the pouch and its contents is supported by the metal of the door frame. If it is desired to remove the pouch, this can be done easily and the screws replaced in the holes that were drilled for them, without significantly affecting the appearance of the inside panel.

Since the length of the bracket is adjustable, it can be used with a wide range of doors of different widths, from about 71 cm (the width of the pouch) to about 105 cm.

It will be appreciated that the invention is not restricted to the particular embodiment that has been described, and that variations may be made therein without departing from the scope of the invention as defined in the appended claims and equivalents thereof. For example, the invention is not limited to the particular arrangement and sequence of stitching employed to define the pocket and sleeve in the sheet 2. The invention is not restricted to a particular size of sheet or length of bracket.

I claim:

1. A method of mounting a pouch on a vehicle door comprising a frame, an inside panel, and screws securing the inside panel to the frame by engagement with respective screw holes in the frame, said method comprising:

(a) selecting two screws at opposite respective edges of the panel, (b) providing an elongate mounting bracket having two opposite ends and having a hole adjacent each end, the distance between the holes in the bracket being substantially equal to the distance between the selected screws, and the bracket being coupled to the pouch, (c) removing the selected screws from their respective screw holes in the frame, (d) placing the bracket against the door panel with the holes in the bracket aligned with the screw holes in the door frame, and (e) inserting the screws into the door frame through the respective holes in the mounting bracket.

2. A method according to claim 1, wherein the mounting bracket is adjustable in length, and the step of placing the bracket against the door panel comprises adjusting the length of the bracket such that the holes in the bracket are aligned with the screw holes in the door frame.

3. A method according to claim 2, wherein step (b) comprises providing a bracket composed of first and second bars and a clip holding the bars in a manner that permits only longitudinal movement of the bars relative to each other.

4. A method according to claim 1, wherein step (b) comprises providing a mounting bracket that is adjustable in length.

5. In combination, a vehicle door having a metal frame and an inside panel, the inside panel being attached to the frame by screws engaging respective screw holes in the door frame, and a pouch assembly for attachment to the door, the pouch assembly comprising:

an elongate mounting bracket having first and second opposite ends and having a hole at each end, the bracket comprising first and second bars and a clip holding the bars in a manner that permits only longitudinal movement of the bars relative to each other, whereby the bracket is adjustable in length, and a pouch formed with a tubular sleeve through which the mounting bracket extends so that the pouch is supported relative to the door when the bracket is attached by the opposite ends thereof to the door by screws passing through the holes in the bracket and engaging the screw holes in the door frame.

6. In combination, a vehicle door having a metal frame and an inside panel, the inside panel being attached to the frame by screws engaging respective screw holes in the frame, and a pouch assembly attached to the door, the pouch assembly comprising:

an elongate mounting bracket having first and second opposite ends and having a hole at each end, the holes being aligned with first and second screw holes respectively in the door frame, and the bracket comprising first and second bars and a clip holding the bars in a manner that permits only longitudinal movement of the bars relative to each other, first and second screws passing through the holes in the bracket into engagement with said first and second screw holes respectively, and a pouch formed with a tubular sleeve through which the mounting bracket extends, whereby the pouch is coupled to the mounting bracket and is supported thereby relative to the door.

* * * * *